(12) United States Patent
Uliyar et al.

(10) Patent No.: US 11,074,770 B2
(45) Date of Patent: Jul. 27, 2021

(54) VEHICLE MONITORING SYSTEM AND METHOD USING A CONNECTED CAMERA ARCHITECTURE

(71) Applicant: LightMetrics Technologies Pvt. Ltd., Bangalore (IN)

(72) Inventors: Mithun Uliyar, Bangalore (IN); Ravi Shenoy, Bangalore (IN); Soumik Ukil, Bangalore (IN); Krishna A G, Bangalore (IN); Gururaj Putraya, Bangalore (IN); Pushkar Patwardhan, Bangalore (IN)

(73) Assignee: Lightmetrics Technologies PVT. LTD., Bangalore (IN)

( * ) Notice: Subject to any disclaimer, the term of this patent is extended or adjusted under 35 U.S.C. 154(b) by 0 days.

(21) Appl. No.: 16/612,005

(22) PCT Filed: May 10, 2018

(86) PCT No.: PCT/IN2018/050291
§ 371 (c)(1),
(2) Date: Nov. 8, 2019

(87) PCT Pub. No.: WO2018/207210
PCT Pub. Date: Nov. 15, 2018

(65) Prior Publication Data
US 2020/0168014 A1 May 28, 2020

(30) Foreign Application Priority Data
May 10, 2017 (IN) .............................. 201741016494

(51) Int. Cl.
*G07C 5/00* (2006.01)
*G07C 5/08* (2006.01)
(Continued)

(52) U.S. Cl.
CPC ....... *G07C 5/0866* (2013.01); *G01C 21/3453* (2013.01); *G06K 9/00744* (2013.01);
(Continued)

(58) Field of Classification Search
CPC .. G07C 5/0866; G07C 5/008; G06K 9/00744; G06K 9/00791; G01C 21/3453;
(Continued)

(56) References Cited

U.S. PATENT DOCUMENTS 8,520,070 B1 8/2013 Englander et al.
2007/0268158 A1 11/2007 Gunderson et al.
(Continued)

OTHER PUBLICATIONS

Malekian et al. "Design and Implementation of a Wireless OBD II Fleet Management System". (Year: 2017).*

*Primary Examiner* — Zhihan Zhou
(74) *Attorney, Agent, or Firm* — Kanika Radhakrishnan; Evergreen Valley Law Group

(57) ABSTRACT

The invention provides a system and method of monitoring a vehicle during commute. The system comprising of one or more camera modules in communication with one or more computation device. A camera module is configured to collect multiple data during the commute including video frames of one or more views, and location, position, direction, orientation, velocity and the combination thereof of the vehicle. The collected data is sent to a computation device where the data is analyzed to identify events and the same will be notified to one or more user device(s). In one embodiment, the communication between the computation device and the camera module may be carried out wirelessly via Wi-Fi where the camera module is configured to act in one or more modes of communication such as an access point (AP) mode or a station (STA) mode or Wi-Fi direct or the combination thereof.

24 Claims, 8 Drawing Sheets

(51) Int. Cl.
*H04W 4/029* (2018.01)
*G01C 21/34* (2006.01)
*G06K 9/00* (2006.01)
*H04W 12/08* (2021.01)

(52) U.S. Cl.
CPC ......... *G06K 9/00791* (2013.01); *G07C 5/008* (2013.01); *H04W 4/029* (2018.02); *H04W 12/08* (2013.01)

(58) Field of Classification Search
CPC ....... H04W 12/08; H04W 4/90; H04W 4/029; H04N 5/23206; H04N 5/247; H04N 5/23203; H04N 7/181; H04N 5/23245; B60R 25/305
See application file for complete search history.

(56) References Cited

U.S. PATENT DOCUMENTS

| | | | |
|---|---|---|---|
| 2010/0157061 A1* | 6/2010 | Katsman | G07C 5/0866 348/149 |
| 2013/0135472 A1 | 5/2013 | Wu et al. | |
| 2016/0353497 A1* | 12/2016 | Oakes | H04L 12/6418 |
| 2016/0381292 A1* | 12/2016 | Lu | H04N 5/2258 348/36 |
| 2017/0013667 A1* | 1/2017 | Yang | H04W 52/0229 |
| 2017/0021875 A1* | 1/2017 | Lee | H04N 21/25816 |
| 2017/0064754 A1* | 3/2017 | Choi | H04W 4/80 |
| 2017/0217372 A1* | 8/2017 | Lu | H04N 5/23293 |
| 2018/0091985 A1* | 3/2018 | Thanayankizil | H04W 4/40 |
| 2018/0176500 A1* | 6/2018 | Yokomitsu | H04N 7/185 |
| 2020/0045239 A1* | 2/2020 | Suzuki | G01C 21/00 |

\* cited by examiner

VEHICLE MONITORING SYSTEM AND METHOD USING A CONNECTED CAMERA ARCHITECTURE

TECHNICAL FIELD

The present invention generally relates to telematics and more particularly to a system and method of monitoring a vehicle.

BACKGROUND

Conventionally, a vehicle is equipped with one or more camera modules for recording activities in and around the vehicle. These cameras are commonly known as dashcams. The activities recorded in and around the vehicles in the form of videos are used to analyze the activities with multiple perspectives. Further the recorded videos are used to determine visual context of the event or activity, assign accountability and collect evidence associated with the event. For example, during an accident, the recorded videos from the dash camera of the vehicle can be used as evidence to infer who was at fault for the accident. In addition, insurance companies provide discounts on vehicle insurance premiums for drivers who are willing to put dash cameras on their vehicles.

Recently, dash cameras have started to include features that are well-known in the Advanced Driver Assistance Systems (ADAS) realm. For example, dash cameras include ADAS features, such as, warning system for lane departure, pedestrian detection, motorcyclist detection, bicyclist detection, distance of the vehicle from other vehicles in a close proximity travelling on the same lane, traffic signs warning, and the like. However, a significant amount of processing on the recorded videos in the dash cameras is required for enabling ADAS features. Further, the computational complexity in a processor increases linearly with number of distinct features that are included/added in the dash cameras. Furthermore, the processor designed for Digital Video Recorder (DVR) applications (inexpensive and contains specific components for video encoding etc.) in the dash camera cannot be used for implementing ADAS features. Alternatively, if the dash camera is modified and designed to include additional circuitry for implementing one or more powerful processors, then cost of the dash camera increases drastically, thereby inhibiting widespread use. Moreover, without being able to change the processor and Graphical Processing Units (GPUs), a driver is tied to a limited set of ADAS features that cannot be upgraded over the life-cycle of the dash camera.

In view of the above, there is a need of a system that is cost effective yet feature rich to ensure dash cameras can implement a wide range of features of the ADAS system.

SUMMARY

The invention provides a system and method of vehicle monitoring where the system comprising of at least one camera module configured to capture plurality of video frames of at least one view during commute of the vehicle, the at least one camera module configured to be in at least one communication mode of a plurality of communication modes comprising at least Access point (AP) mode, Station (STA) mode and Wi-Fi direct mode and at least one computation device configured to be in the at least one communication mode of a plurality of communication modes, each comprising a processor configured to send a notification to the at least one camera module to switch modes within the plurality of communication modes, receive the plurality video frames from the at least one camera module in the station mode and determine at least one event from analyzing the plurality of video frames.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an example embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
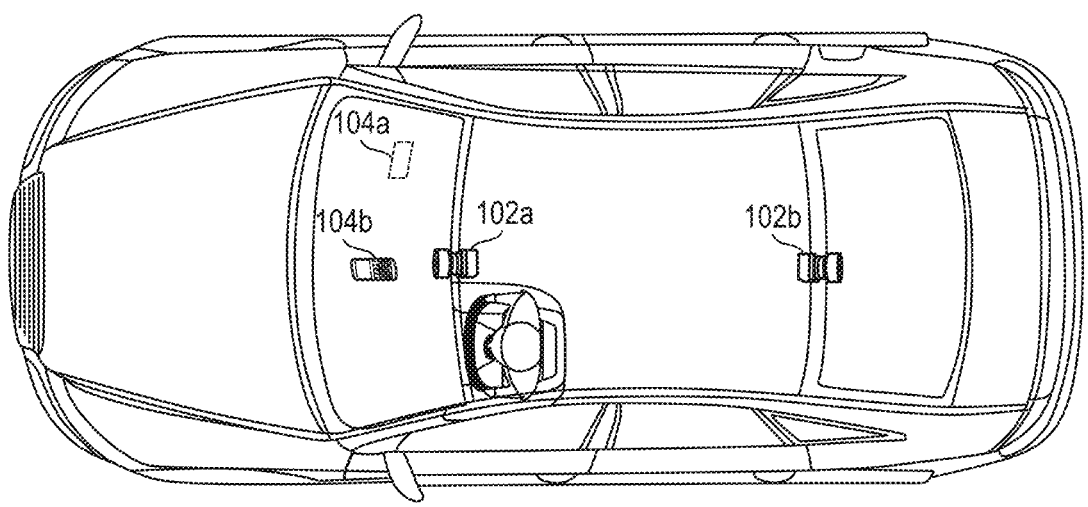
FIG. 1 illustrates a connected camera architecture, in accordance with an example embodiment.

Referring now to FIG. 1, a connected camera architecture 100 is illustrated in accordance with an example embodiment. The connected camera architecture 100 may be employed, for example, in the vehicle of a user, and acts as a vehicle monitoring system for the vehicle.

The connected camera architecture 100 includes at least one camera module such as camera modules 102a, 102b and at least one computation device such as computation devices 104a, 104b. The camera modules 102a, 102b have limited processing capabilities and are communicably coupled to the computation devices 104a, 104b. Each of the camera modules 102a, 102b includes a video streaming server (not shown in FIG. 1) that is configured to transmit video frames via wireless communication module to the computation devices 104a, 104b. Only the two camera modules 102a, 102b are shown for example purposes, and it should be noted that many such camera modules can be deployed within or on exterior of a vehicle 106. In the illustrated embodiment, the camera modules 102a, 102b are placed/mounted on any exterior structure of the vehicle 106 in such a way that, the camera modules 102a, 102b are capable of capturing the at least one view of the vehicle 106 such as front view, side view or back view depending upon orientation of the camera modules 102a, 102b. For example, the camera module 102a is mounted on front windshield of a four-wheeled vehicle to capture front view of the vehicle 106, and the camera module 102b is mounted on rear windshield of a four-wheeled vehicle 106 to capture the rear view of the vehicle 106.

Further, with respect to FIG. 1, the camera modules 102a, 102b are configured to capture multiple video frames of a view during a commute of the vehicle 106. The camera modules 102a, 102b are configured to transmit the captured video frames to a computation device 104 for further processing via a communication module (not shown). In a preferred embodiment, the communication module may be any wireless protocol that supports video streaming, such as, Wireless Fidelity (Wi-Fi). It should be noted that though the connected camera architecture 100 (as shown in FIG. 1) may include multiple of such computation devices 104a, 104b with additional processing capabilities. Also, even one camera module 102a or 102b can include many sub-camera modules that can be communicably linked with one or more computation devices 104a, 104b.

Examples of the computation device 104a, 104b are not limited to mobile phones only, and the computation devices 104a, 104b may take examples of any portable electronic device (e.g., smartphones, tablet, mobile computers, gaming devices, etc.) having cellular communication capabilities. Under certain circumstances, the computation devices 104a, 104b may also be a processing unit inside an on-board diagnostic (OBD) port assembly, or an external processing box or a processor embedded in the dashboard of the vehicle (e.g. android/apple auto). Each of the camera module 102a, 102b may be a dash camera configured to continuously record the view corresponding to respective orientation.

The computation devices 104a, 104b include a processing unit (not shown in FIG. 1) that is computationally powerful. Additionally, or optionally, the processing unit contains a dedicated GPU for processing video frames captured by the camera modules 102a, 102b. The processing unit of the computation devices 104a, 104b receives video frames from the camera modules 102a, 102b and processes the video frames to detect and recognize various objects in the scene such as traffic signs, lanes, pedestrians, and the like. In some implementations, the computation devices 104a, 104b should be able to access Internet through cellular connection for being able to send video frames corresponding to a trigger to external user devices.

The camera modules 102a, 102b of the connected camera architecture 100 are designed to be inexpensive and are configured to be interoperable with one or more computation devices, that is, the computation devices 104a, 104b, using various internet protocols, are able to instruct the camera modules 102a, 102b at various levels. Each of the camera modules 102a, 102b of the connected camera architecture 100 are identified using a unique respective service set identifier (SSID) assigned to each of the camera modules 102a, 102b. For instance, if there are multiple camera modules 102a, 102b present in the connected camera architecture 100, each camera module has a unique ID. The unique identifier helps the computation devices 104a, 104b to connect with a destined camera module. Also, the video frames captured by any of the camera modules 102a, 102b should not be accessible to non-authorized personnel by their corresponding computation devices.

Figure 2:
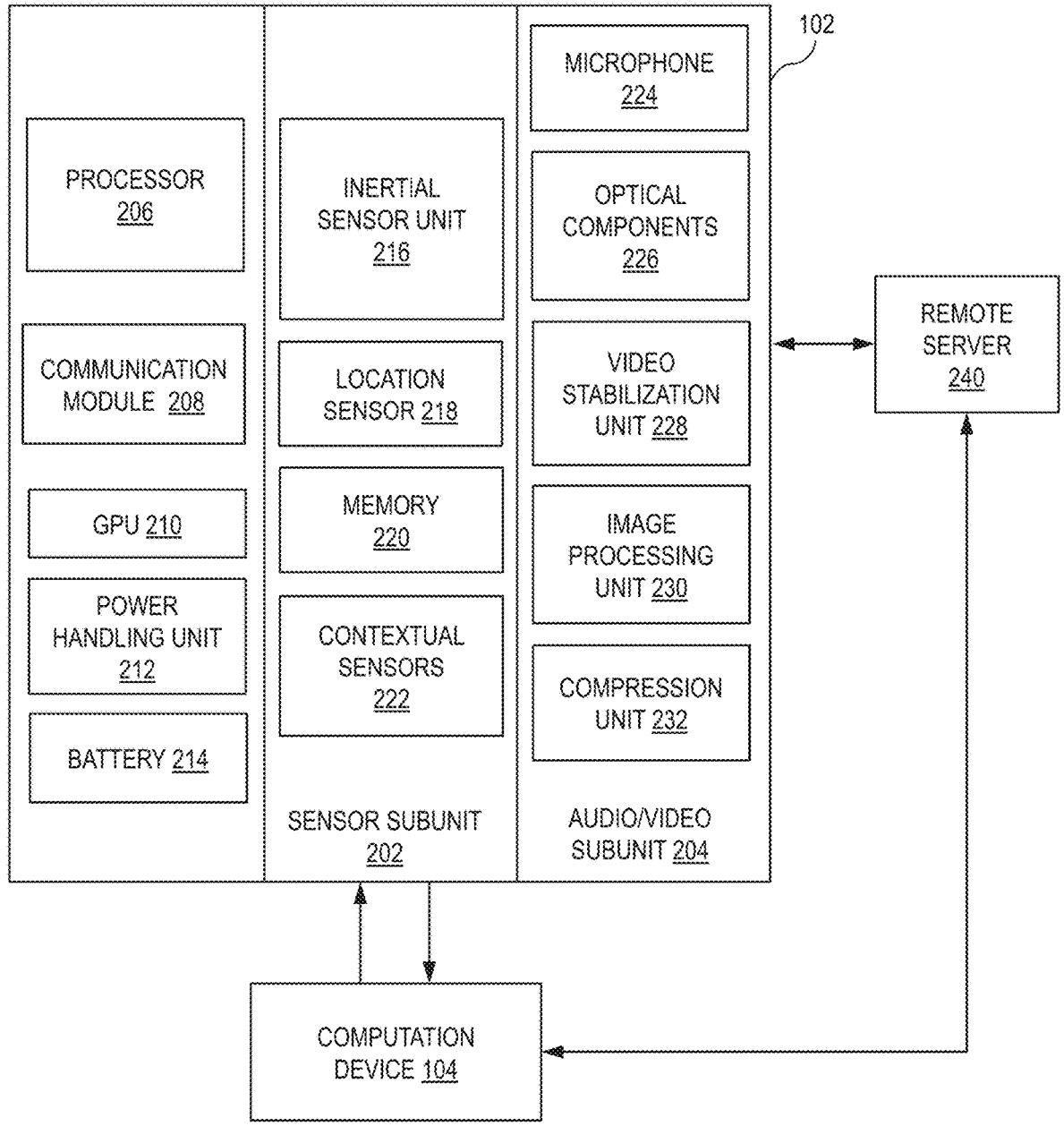
FIG. 2 is a block diagram representation of a vehicle monitoring system including a dash camera module and a computation device, in accordance with an example embodiment.

FIG. 2 is a block diagram representation of a vehicle monitoring system 200 including a dash camera module 102 and the computation device 104 in accordance with an example embodiment. The dash camera module 102 is an example of the camera modules 102a, 102b and the computation device 104 is the example of the computation devices 104a, 104b shown and explained with reference to FIG. 1.

The system 200 includes the dash camera module 102, which further includes a sensor subunit 202 and an audio/video subunit 204, a processor 206, a communication module 208, a GPU 210, a power handling unit 212, a battery 214 and a memory 220. The processor 206 may be embodied in a number of different ways. The processor 206 may be embodied as a multi-core processor, a single core processor; or combination of multi-core processors and single core processors. For example, the processor 206 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions that can be accessible to the processor 206. Alternatively, or additionally, the processor 206 may be configured to execute hard coded functionality. As such, whether configured by hardware or software methods, or by a combination thereof, the processor 206 may represent an entity, for example, physically embodied in circuitry, capable of performing operations according to various embodiments while configured accordingly. For example, if the processor 206 is embodied as two or more of an ASIC, FPGA or the like, the processor 206 may be specifically configured hardware for conducting the operations described herein.

Alternatively, as another example, if the processor 206 is embodied as an executor of software instructions, the instructions may specifically configure the processor 206 to perform the algorithms and/or operations described herein when the instructions are executed. However, in some cases, the processor 206 may be a processor of a specific device, for example, a mobile terminal or network device adapted for employing embodiments by further configuration of the processor 206 by instructions for performing the algorithms and/or operations described herein. The processor 206 may include, among other things, a clock, an arithmetic logic unit (ALU) and logic gates configured to support operation of the processor 206.

The communication module 208 enables point-to-point connection between the dash camera module 102 and the computation device 104. The dash camera module 102 may be configured using one or more computation devices 104 that send control information to the camera module 102 over Wi-Fi, Bluetooth or through any other wireless protocol. This ensures that the dash camera module 102 is interoperable with a variety of the computation devices 104 using different internet protocols. In one embodiment, the computation device 104 accesses internet through a cellular network and shares the internet with the camera module 102 via Wi-Fi tethering or hotspot. Further, each camera module 102 is associated with a pre-setting in such a way that as soon as the camera module 102 is turned on, the computation device 104 auto-connects the camera module 102.

The GPU 210 is configured to process the video frames that are captured by the dash camera module 102. The power handling unit 212 manages power requirements of the dash camera module 102. Additionally or optionally, the dash camera module 102 includes the battery 214 that provides back-up power for the dash camera module 102. In one embodiment, the power handling unit 212 acquires the required power from the vehicle engine (not shown the FIG. 2) and hence as soon as the vehicle starts, the dash camera module 102 turns ON and gets connected to the computation device 104 via Wi-Fi (or any other wireless communication protocol)

The dash camera module 102 further includes the memory 220 for storage of images/video. Alternatively, the dash camera module 102 includes an interface for inserting external memory storage cards. Examples of the memory 220 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 220 may be configured to store information, data, applications, instructions and the like for enabling the dash camera module 102 to carry out various functions in accordance with various example embodiments. For example, the memory 220 may be configured to store contextual data and multi-sensor data for processing by the processor 206. Additionally or alternatively, the memory 220 may be configured to store instructions for execution by the processor 206.

The sensor subunit 202 includes one or more of an inertial sensor unit 216, a location sensor 218 and one or more contextual sensors 222. The inertial sensor unit 216 includes one or more sensors, such as, an accelerometer, a magnetometer and a gyroscope where the inertial sensor unit 216 senses the combination of position, direction, orientation and velocity of the vehicle. The location sensor 218 is configured to determine current location of the dash camera module 102 based on data obtained from location services, such as, Global Positioning System. The one or more contextual sensors 222 in the sensor subunit 202 capture environment ambience such as, temperature, humidity, sun light, and the like. In an alternative embodiment, the sensor subunit 202 is disposed on the computation device 104.

The audio/video subunit 204 includes a microphone 224, optical components 226, an image processing unit 230 and a compression unit 232. The microphone 224 is configured to acquire audio signals corresponding to the video frames captured by the dash camera module 102. The optical components 226 include one or more image sensors, one or more focusing elements and optical filters such as Near Infra-Red (NIR), polarization, etc. The image processing unit 230 includes one or more processors such as the processor 206. Alternatively, the image processing unit 230 includes GPUs or digital signal processing units for processing the video frames that are captured by the camera module 102. The compression unit 232 comprises dedicated hardware that execute algorithms for compressing audio and video data corresponding to the video frames captured by the camera module 102 for transmission to an external storage/device. A video streaming server can be implemented in the processor 206 to transmit video frames over Wi-Fi using Internet protocol (IP) to the one or more computation device 104. Alternatively, a dedicated hardware for video streaming can be embedded within the compression unit 232 for improved power efficiency. Additionally or optionally, the audio/video subunit 204 includes a video stabilization unit 228 configured to compensate for camera movement.

The processor 206 of the dash camera module 102 is configured to maintain video streams buffered at different resolutions and bit-rates. The default streaming could be at a lower bit-rate/resolution, and as and when the computation device 104 requests, the bitrate/resolution of the video frames can be sent from buffered sequence of different bitrate/resolution. Data obtained from the inertial sensor unit 216 and the location sensor 218 is sent to the computation device 104 that is coupled to the dash camera module 102. Additionally or optionally, the camera module 102 comprises a hard reset button (not shown). The camera module 102 will be restored to default setting when the hard rest button is pressed. Alternatively, the dash camera module 102 can be reset to the default settings through software Application Program Interface (API) that the computation device 104 can use if desired to make a hard reset without anyone having to intervene.

The processor 206 is configured to receive requests from the one or more computation devices 104. The requests from the one or more computation devices 104 correspond to configuration and control data for setting various parameters in the sensor subunit 202 and the audio/video subunit 204. For example, the computation device 104 may request to configure the optical components 226 of the dash camera module 102 by providing configuration data corresponding to parameters such as, capture parameters such as resolution, exposure, focus, ISO, frame rate, camera position information, bit rate and I-frame rate, camera sensor orientation, and the like. Some examples of configuration and control data include but not limited to:

compression settings to the compression unit 232, such as choice of compression standard, bit rate, resolution and the like network related request to the networking unit or the communication module 208 such as choice of protocol microphone configuration data to the microphone 224 such as sampling rate, digital/analog filters, and compression settings sensor configuration data to the sensors such as sampling rate, digital and analog filters, camera sensor orientations, etc.

enable/disable features that are implemented on the dash camera module 102 power saving settings to the power handling unit 212 enable/disable on screen display (OSD)

software API to do a hard reset

Communication Protocol:

The dash camera module 102 is configured to work with a variety of off-the shelf computation devices 104 (mostly smartphones running on different operating systems, DVRs, tablets, and the like). The dash camera module 102 has a unique ID or Service Set Identifier (SSID) and a password. The unique SSID ensures that two different computation devices do not connect to the camera module 102, thereby preventing unauthorized access to the video frames captured by the dash camera module 102. In one embodiment, the SSID and password for the dash camera module 102 maybe set from a remote server 240, and the computation device 104 is configured to fetch the SSID and the key that needs to be set for accessing the camera module 102 from the remote server 240, thereby preventing unauthorized access to the camera module 102. The processor 206 on the dash camera module 102 handles incoming requests from the one or more computation devices 104. For instance, the SSID and/or the password (key) received from the computation device 104 is matched with the SSID and/key assigned to the camera module 102, respectively, and if these attributes match, then the data (video frames) is provided from the camera module 102 to the computation device 104.

In an embodiment, the unique SSID of the dash camera module 102 is configured to accept an open connection without a password (key-phrase) from the one or more computation devices 104. After a connection is established between the dash camera module 102 and the computation device 104, authentication is performed using additional credentials, such as login name/email and password.

Alternatively, the one or more computation devices 104 may connect to the dash camera module 102 over a Bluetooth connection. In such cases, authentication is performed using credentials, such as, a login name and password (key-phrase). After successful authentication, the dash camera module 102 accepts configuration parameters over Bluetooth.

The dash camera module 102 is configured to operate in multiple modes and can be configured to dynamically switch between the multiple modes as the one or more computation devices (e.g., D1, D2, . . . Dn) have various limitations. For instance, some computation devices (e.g., Android™ smartphones) do not allow data transmission through cellular connectivity when the computation device is connected to an external Wi-Fi AP. In such cases, the camera module (in AP mode) connected to the computation device 104 does not allow data connectivity needed for navigation, etc. In addition, some cellular operators do not allow data transmission on cellular connectivity when the computation device 104 is acting as a hotspot. In such cases, even though the cellular data is not being used directly for this application (accessing the camera module 102), the computation device 104 loses access to cellular data, when the computation device 104 acts as an access point (hotspot).

The dash camera module 102 is configured to operate in any of a plurality of communication modes. Examples of the plurality of communication modes include but not limited to an access point (AP) mode or a station mode (STA mode). Another example of the communication mode includes a Wi-Fi direct mode. The dash camera module 102 boots for the first time in the AP mode as a Wi-Fi access point (AP) with a default SSID (e.g. CAM_AP) and default key (default case) which is set through the remote server such as the remote server 240. Any computation device (D1) of the one or more computation devices (D1, D2, . . . Dn) can connect to the dash camera module 102. However, the camera module 102 does not send video streams to the computation device (D1) that is connected. The dash camera module 102 is configured to accept commands to switch from one mode to another mode. For example, the camera module 102 receives commands from the computation device (D1) to switch from the AP mode to the STA mode. The default AP mode can be restored when the hard-reset button (not shown) of the dash camera module 102 is pressed. The one or more computation devices (D1, D2, . . . Dn) can send commands to connect to the dash camera module 102 for connecting in any one of the modes.

In an embodiment, the computation device (e.g., device D1) after connecting to the camera module 102, after booting for the first time, can configure the camera module 102 to operate in the AP mode. The SSID and password for the dash camera module 102 maybe different from the default case, hence the computation device (D1) is configured to fetch the SSID and the key that needs to be set for accessing the camera module 102 from the remote server 240, thereby preventing unauthorized access to the camera module 102. If the dash camera module 102 connects to different computation devices at different times, then the computation devices can fetch login credentials (SSID and password) from the remote server 240 and connect to the camera module 102. For example, if the dash camera module 102 connects to the first computation device (D1) in morning and to the second computation device (D2) in evening, different SSID and password are generated for the first and second devices (D1) and (D2) for connecting to the camera module 102. Since access to information in the remote server 240 is controlled, unauthorized personnel may not know the credentials for accessing the camera module 102.

Alternatively, a copy of the information corresponding to combinations of SSID and passwords in the remote server 240 are stored on a local database (e.g., the memory 220) in the camera module 102. This local database can be time and location indexed such that the SSID and the password are chosen automatically based on location and time.

In an embodiment, if one or more computation devices (D1, D2, . . . Dn) desire to activate the STA mode, then the computation device (D1) sends configuration information (notification) such as, SSID corresponding to the camera module 102 that the computation device (D1) intends to connect, key phrase for authentication, DNS server address, static IP (if needed), net mask, etc., to the camera module 102. After sending the configuration information (notification), the computation device (D1) sends a command to the camera module 102 for performing a soft reboot of the camera module 102. Alternatively, the camera module 102 automatically performs a self-reboot on receiving the configuration information. After the camera module performs the soft reboot, the camera module 102 operates in the STA mode. The camera module 102 operating on the STA mode performs a search operation for determining at least one computation device (e.g., device D1) that broadcasts SSID corresponding to the camera module 102 for establishing a connection within vicinity. The camera module 102 establishes a connection with the computation device (D1) that broadcasts SSID corresponding to the camera module 102. The computation device (D1) in the meantime is reconfigured to be operating as an access point for the camera module 102. In the STA mode, the camera module 102 starts streaming video (providing/sharing video streams) to the computation device (D1) as soon as the computation device (device D1) initiates a start video request. The camera module 102 operating in the STA mode is useful for cases where the computation device (device D1) can activate a hotspot and is also connected to the internet through cellular data connection.

In an embodiment, if a computation device (e.g., D1) supports Wi-Fi direct (peer-to-peer protocol by Wi-Fi Alliance) the computation device (D1) sends a command to the camera module 102 to be in Wi-Fi direct mode. The computation device (D1) sends the command (corresponding to Wi-Fi direct mode) to the default access point (AP) of the camera module 102 at the boot time. After receiving the command from the computation device (D1), the camera module 102 may do a soft reboot and activate itself to be in the Wi-Fi Direct mode. The Wi-Fi direct mode permits receiving data from the camera module 102 as well as cellular connectivity at the same time. The one or more computation devices (D1, D2, . . . Dn) which are capable of supporting the Wi-Fi direct mode benefit. It must be noted that the camera module 102 is programmed to boot in any one of the modes for the next boot up. Alternatively, the camera module 102 can boot in an ad-hoc mode that permits any computation device of the one or more computation device (D1, D2, . . . Dn) to connect to the camera module 102 and reconfigure the camera module 102 appropriately.

In an embodiment, the dash camera module 102 can be configured to operate in more than one mode at a given time, for example, the camera module 102 operates in STA and AP modes simultaneously. In such cases, the camera module 102 connects to a first computation device (e.g., device D1) in the station mode (STA) and broadcasts to a second computation device (e.g., other computation devices say devices D2, D5, D8) through the AP mode, or vice versa.

In an embodiment, the dash camera module 102 can be configured to operate in a Bluetooth mode. In such cases, the camera module 102 acts as a slave and connects to at least one of the one or more computation devices (D1, D2, . . . Dn) which acts as a master. In an embodiment, each camera module 102 of a plurality of dash camera modules act as a slave and is configured to connect to the computation device (e.g., computation device D1) and send their respective video frames. In an embodiment, one or more dash camera modules of the plurality of dash camera modules is configured to send video frames to their master (say, computation device D2) over Bluetooth and remaining camera modules of the plurality of camera modules are configured to communicate over Wi-Fi with the master (e.g., computation device D2). The Bluetooth master device (computation device D2) is configured to send the video frames from the one or more dash camera modules (slave device) to the other computation devices (D1, D5, D6) over Wi-Fi.

The dash camera module 102 is configured to receive video frames from the audio/video subunit 204. The dash camera module 102 maintains one or more video buffers for storing the video frames from the audio/video subunit 204. Further, the dash camera module 102 also maintains one or more sensor buffers that are configured to buffer sensor data from the inertial sensor unit 216 and the contextual sensors 222 of the sensor subunit 202. In the default case, the video frames that are compressed in the compression unit 232 and sensor data (from the inertial sensor unit 216 and the contextual sensors 222) are sent to the one or more computation devices (D1, D2, . . . Dn) immediately after configuration/boot up of the camera module 102. Alternatively, the dash camera module 102 may send data in response to triggers which is generated either by the dash camera module 102 or from any of the computation devices of the one or more computation devices (D1, D2, . . . , Dn).

In an embodiment, the dash camera module 102 is configured to receive triggers and provide video frames corresponding to the trigger to the one or more computation devices (D1, D2, . . . , Dn). As soon as the trigger is received, the dash camera module 102 is configured to transmit a preset number of video frames to the computation device (e.g., device D1). Some of the video frames can be from one or more video buffers maintained to save few video frames from recent past prior to receiving the trigger.

In an embodiment, the camera module 102 receives triggers from the one or more computation devices (D1, D2, . . . , Dn) corresponding to an event. The event can be at least one of an event inferred from the inertial sensor, contextual event, location related event, vehicle based event or a combination of the events. For instance, events inferred from inertial sensors of a computation device connected to the camera module 102, such as harsh braking, harsh acceleration, harsh cornering, lane change, crash detection etc. A computation device generates a trigger corresponding to contextual events arising due to change in weather conditions, or change in lighting conditions, etc. Location related events such as entering or leaving a specified zone or area (geofence), vicinity of specific points of interest such as neighborhood of traffic lights, toll booths, road intersections, railroad crossings, school zones, going on a curvy road (data is obtained from maps), can generate triggers from the computation device (e.g., device D1) connected to the dash camera module 102. Further, the computation device (e.g., device D1) generates triggers to the camera module 102 based on detected vehicle related events such as sudden change in Rotation Per Minute (RPM), anomalies detected in speed/rpm/gas pedal position, sudden changes in fuel levels, sensor readings (Oxygen, pressure), when there is a turn light indicator, honking, headlight dipper is activated etc.

In another embodiment, the dash camera module 102 is configured to receive voice activated triggers. For example, driver or passenger in the vehicle gives voice commands that are recognized by the camera module 102. In another embodiment, the dash camera module 102 is configured to receive triggers from wearable devices that detect driver distraction. For instance, a smart watch detects that grip of the driver on steering wheel of the vehicle has loosened and generates a trigger to the camera module 102. Alternatively, if the wearable device is connected to a computation device (say the device D1), the wearable device sends the trigger to the computation device D1 that analyzes the trigger and sends a trigger to the camera module 102 if required. In an embodiment, a trigger is generated from one vehicle to another vehicle in its vicinity. For example, a vehicle receives a trigger from a vehicle in front if the vehicle in front is slowing down or vehicle in front is changing lanes. In an embodiment, infrastructures such as, toll gates and traffic lights generate triggers to the camera module 102 for the driver to be aware of the infrastructure. Alternatively, analysis engines (explained below) present on the camera module 102 or the computation devices (D1, D2, . . . , Dn) analyzes video frames from the dash camera module 102 to generate triggers based on the video frames.

In an embodiment, the analysis engines analyze video frames from the camera module 102 to detect events. Examples of events include, but are not limited to, frequent lane changes, harsh braking, harsh acceleration, cornering, traffic signal violation, obstacle detection, stop sign violation, speed signs, pedestrians, a pedestrian crossing event, tail gating, vehicles passing in blind spot, objects to the rear of the vehicle while backing up, and the like. The analysis engines can be implemented either on the dash camera module 102 or the one or more computation devices (D1, D2, . . . , Dn). For example, video analysis engines can be executed on a computation device (D1) for lane detection, detecting vehicles in front, traffic signs such as speed signs, stop signs, yield signs, etc., traffic lights, pedestrians, cyclist, blind spot warning, and the like. If the analysis engines are implemented on the dash camera module 102, the dash camera module 102 initiates analyzing the video frames in the audio/video sub unit 204 and sensor data (from the inertial sensor unit 216 and the contextual sensors 222) of the sensor subunit 202 to generate triggers.

Figure 3A:
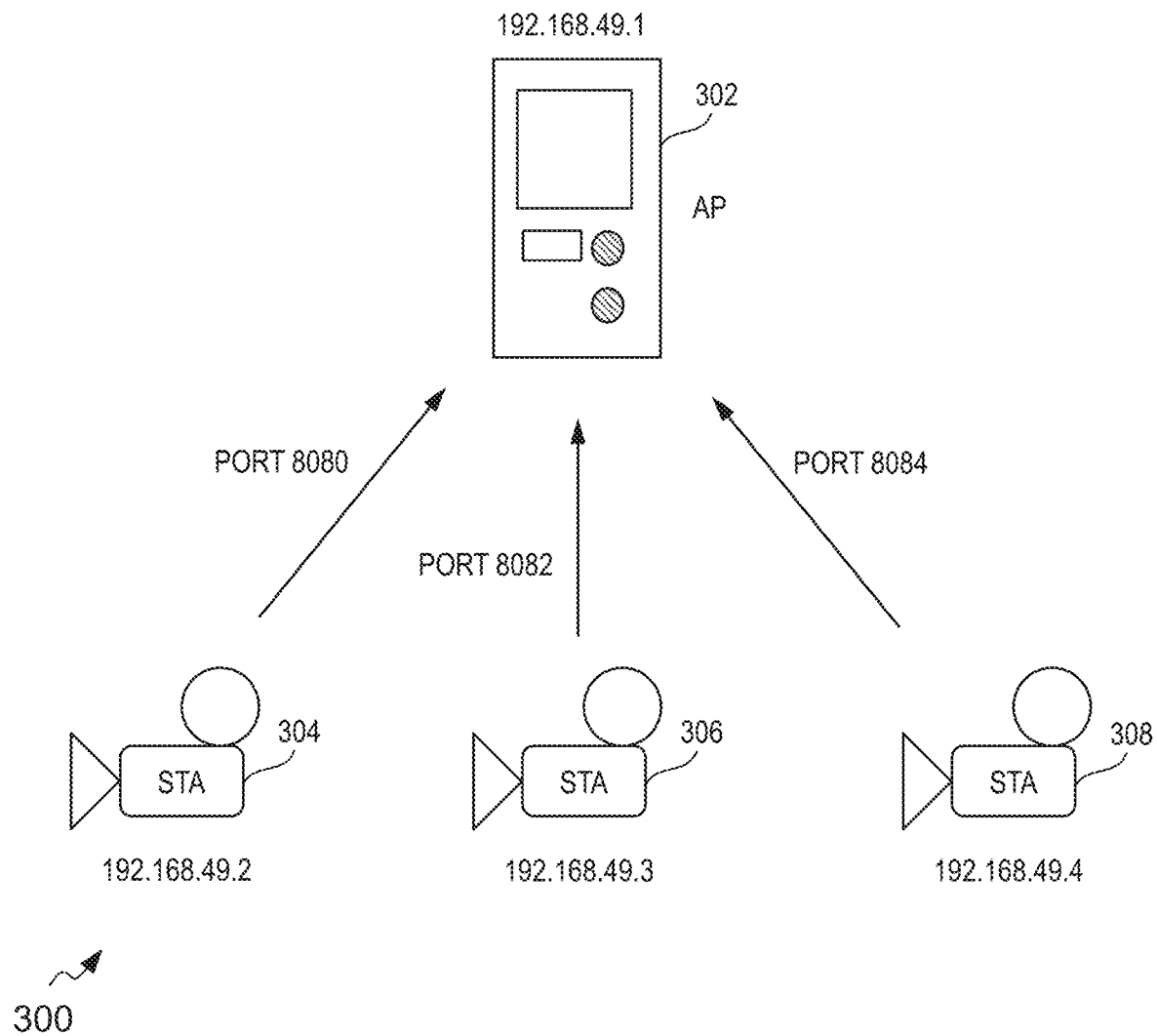
FIG. 3A illustrates a configuration of a connected camera architecture, in accordance with an example embodiment.

Referring now to FIG. 3A, an example representation 300 of connected camera architecture is illustrated in accordance with an example embodiment. In this representation 300, a computation device 302 is shown as connected to dash camera modules 304, 306 and 308. The dash camera module 102 (shown in FIG. 2) is an example of the dash camera modules 304, 306 and 308. The computation device 302 is further explained with reference to FIG. 4. The dash camera modules 304, 306 and 308 are configured to either operate in the same mode or different modes (as explained with reference to FIG. 2).

In this example representation 300, the computation device 302 assumes role of an access point (AP) and the camera modules 304, 306 and 308 are configured to operate in the STA mode. The camera modules 304, 306 and 308 are connected to the computation device 302 that acts as the access point (AP). Each of the camera modules 304, 306, 308 is assigned a different IP address. As shown in the FIG. 3A, the camera module 304 is assigned an IP address 198.169.49.2, the camera module 306 is assigned an IP address 198.169.49.3 and the camera module 308 is assigned an IP address 198.169.49.4. The camera modules 304, 306 and 308 are configured to send video streams on different IP ports to a server on the computation device 302. The camera module 304 sends video streams via port 8080, the camera module 306 sends video streams via port 8082 and the camera module 308 sends video streams via port 8084 to the computation device 302. The computation unit 302 is configured to process the video streams received from the camera modules 304, 306 and 308 for detecting some or all objects of interest and events.

Figure 3B:
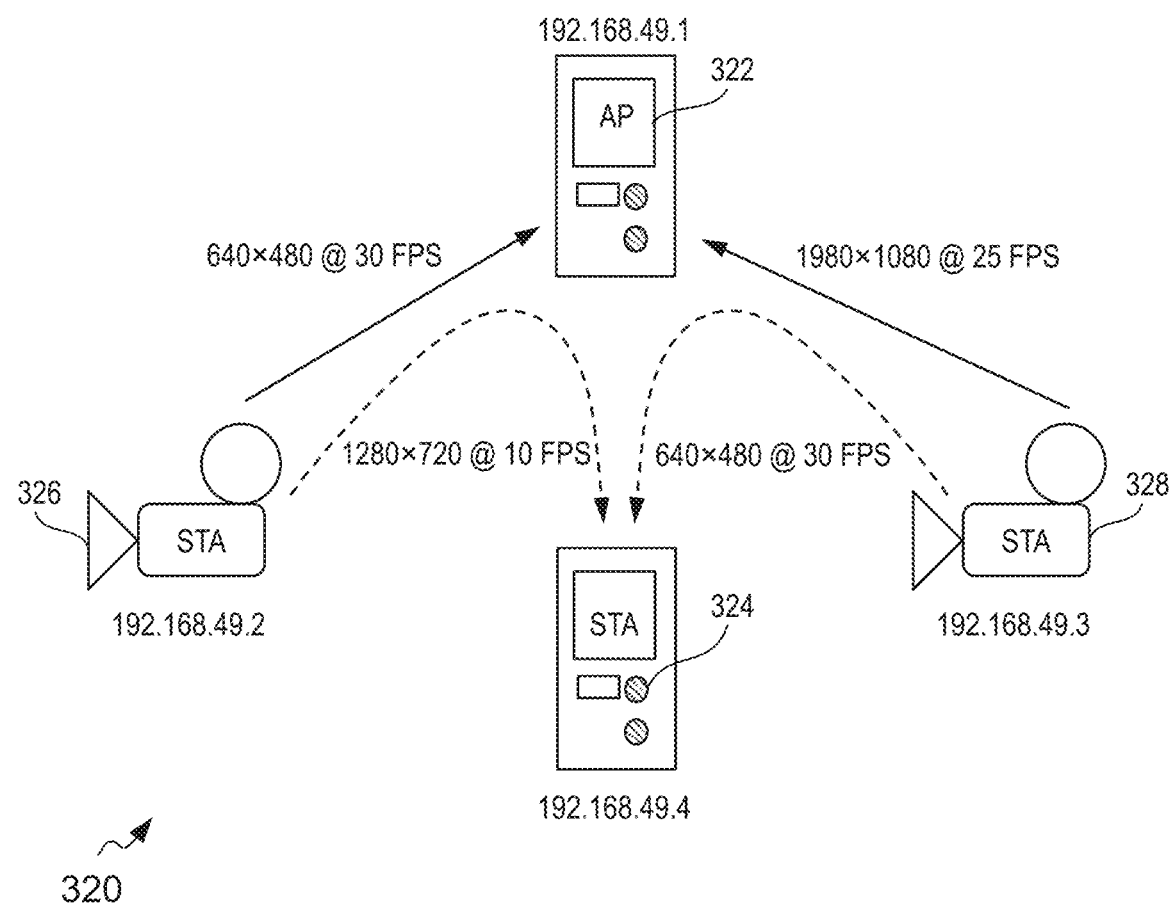
FIG. 3B illustrates a configuration of the connected camera architecture, in accordance with another example embodiment.

Referring now to FIG. 3B, a representation 320 of the connected camera architecture is illustrated in accordance with another example embodiment. In this representation, a first computation device 322, a second computation device 324, a first dash camera module 326 and a second dash camera module 328 are shown. In such cases, one of the computation devices 322 or 324 is configured to assume role of an AP and all other computation devices (either 322 or 324) and camera modules 326, 328 connect to this AP. As shown in FIG. 3B, the computation device 322 acts as the access point (shown as AP in FIG. 3B), the computation device 324 and the camera modules 326, 328 switch to be in a station mode (shown as STA mode in FIG. 3B). The computation device 324 and the camera modules 326, 328 are configured to connect to the access point (the computation device 322) in the STA mode. In an example, the computation device 322 is configured to receive video streams from the camera modules 326 and 328 via separate ports at 30 frames per second (fps) and 25 fps, respectively.

Since the computation devices 322, 324 and the camera modules 326, 328 operate on a single network, the camera modules 326, 328 can broadcast their video streams to any computation device (either 322 or 324) when they receive a request for video stream from the computation devices 322, 324. In this example representation, the computation device 324 requests for video streams from the camera modules 326 and 328. The camera module 326 broadcasts video streams to the computation device 324 at a rate of 10 frames per second (fps) and the camera module 328 broadcasts video streams to the computation device 324 at rate of 30 fps.

Figure 3C:
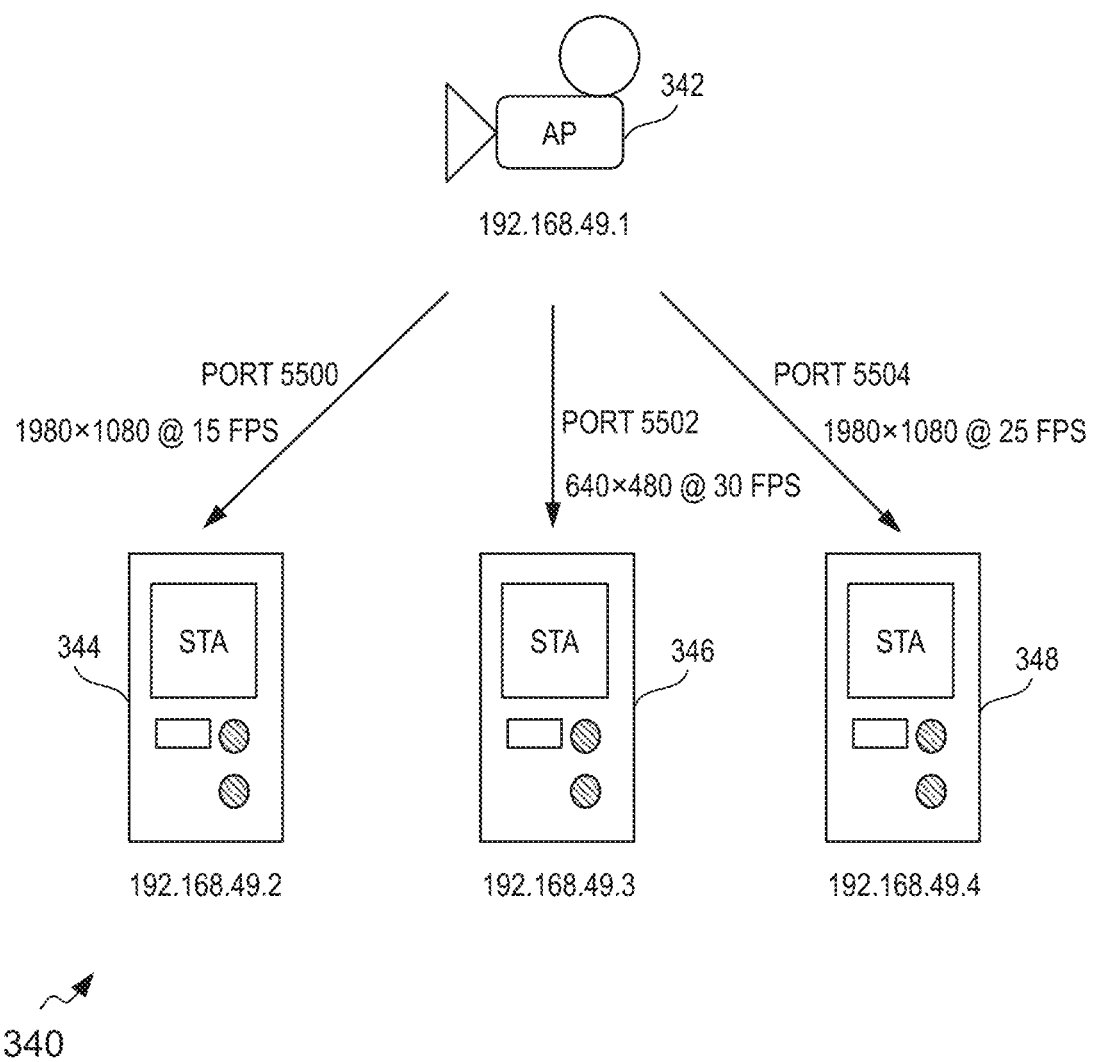
FIG. 3C illustrates a configuration of the connected camera architecture, in accordance with yet another example embodiment.

Referring now to FIG. 3C, a representation 340 of connected camera architecture is illustrated in accordance with yet another example embodiment, in which a camera module 342 and computation devices 344, 346 and 348 are shown. For instance, the computation devices 344, 346 and 348 correspond to smartphones of passengers travelling in a vehicle. The camera module 342 can connect to one or more computation devices, such as, the computation devices 344, 346 and 348.

In this example representation, the camera module 342 is configured to operate as an AP (in AP mode). For instance, the camera module 342 receives notification (e.g., configuration and control data) from a computation device, say, the computation device 346 to operate as an AP. The computation devices 344, 346 and 348 are connected to the AP (i.e. the camera module 342) and are configured to operate in the STA mode. The camera module 342 broadcasts video frames to the computation devices 344, 346, 348 within the vehicle. The computation devices 344, 346, 348 are configured to receive video streams via different ports assigned individually for the computation devices 344, 346, 348. For instance, the computation device 344 receives video streams from the camera module 342 via the port 5500 at 15 fps, the computation device 346 receives video streams from the camera module 342 via the port 5502 at 30 fps and the computation device 348 receives video streams from the camera module 342 via the port 5504 at 25 fps.

Each computation device can be configured to execute one or more analysis engine as explained with reference to FIG. 2. For instance, the computation device 344 analyzes video frames to detect events such as harsh braking, harsh acceleration and harsh cornering and the computation device 346 is configured to analyze frames to detect lanes, determine distance from following/front vehicle. The analyzed data from the computation devices 344, 346, 348 is collated in any one of the computation devices 344, 346, 348. Alternatively, the analyzed data from the computation devices 344, 346, 348 can be sent to a remote server for further processing.

The camera modules described herein such as the camera module 102 (or the camera modules 304, 306, 308, 326, 328, 342) are configured to provide video frames and other sensory data to the computation devices in an encrypted format. An intended computing device from among the at least one computing device is configured to decode the encrypted format. For instance, once the camera module 342 decides to provide the video frames to the computation device 346 in the STA mode, the camera module 342 encrypts the video frames into an encrypted format as already decided between the camera module 342 and the computation device 346. The information of the encrypted format can be initially sent to the camera module 342 from the computation device 346.

Figure 4:
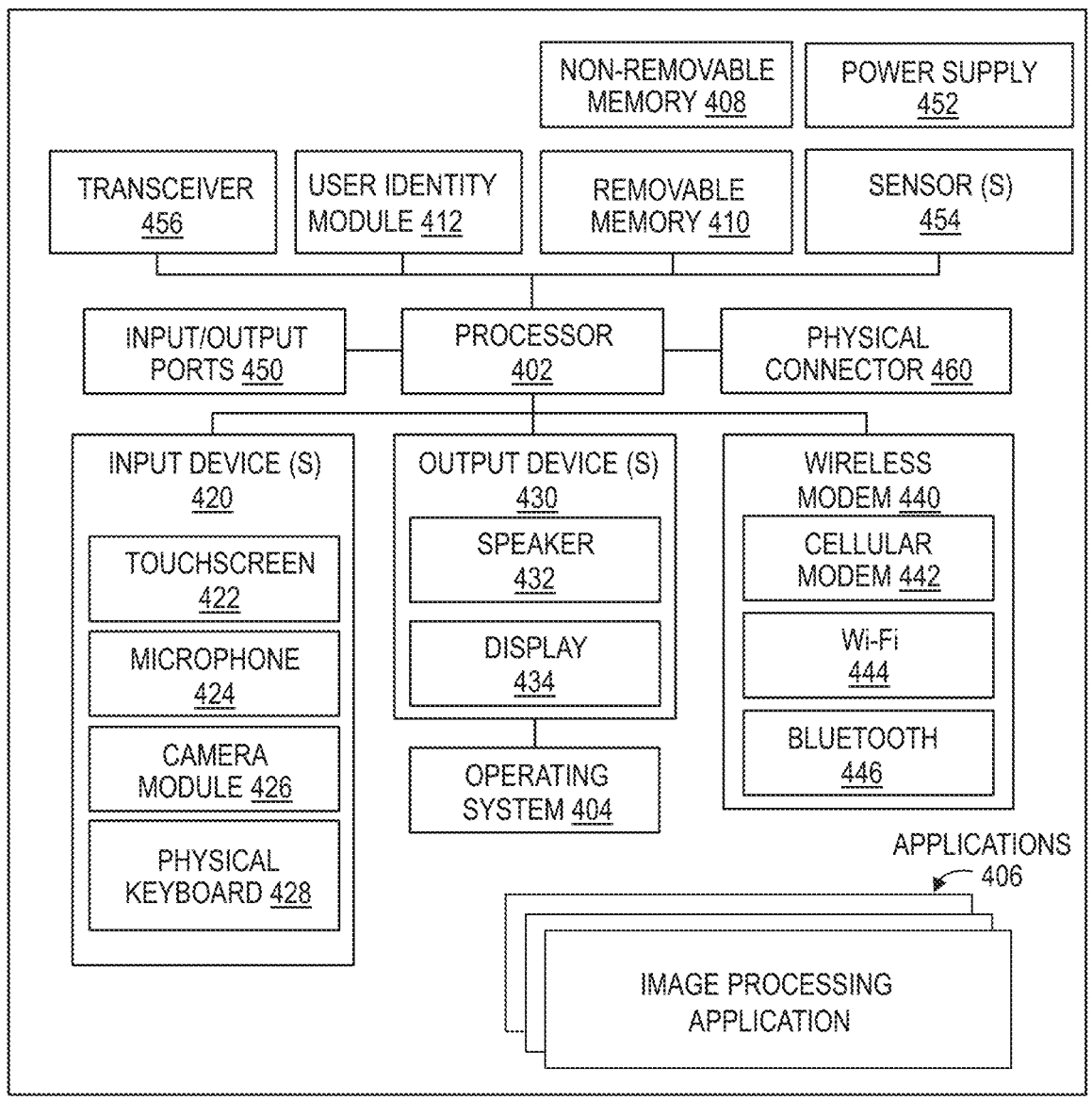
FIG. 4 illustrates a schematic block diagram of a computation device, in accordance with an example embodiment.

FIG. 4 is a schematic block diagram of a computation device such as a mobile device 400 that is configured to connect to a dash camera module, such as the dash camera module 102 (shown and explained with reference to FIG. 2) and perform a wide range of computations on video frames obtained from the dash camera module 102. It should be understood that the mobile device 400 as illustrated and hereinafter described is merely illustrative of one type of device and should not be taken to limit the scope of the embodiments. The mobile device 400 can also include the components of the camera module 102 shown in FIG. 2. As such, it should be appreciated that at least some of the components described below in connection with the mobile device 400 may be optional and thus in an example embodiment may include more, less or different components than those described in connection with the example embodiment of the FIG. 4. As such, among other examples, the mobile device 400 could be any of a mobile electronic device, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices. In an embodiment, the mobile device 400 is an example of the computation device that is explained with reference to FIG. 2.

The illustrated mobile device 400 includes a controller or a processor 402 (e.g., a signal processor, microprocessor, ASIC, or other control and processing logic circuitry) for performing such tasks as signal coding, data processing, image processing, input/output processing, power control, and/or other functions. An operating system 404 controls the allocation and usage of the components of the mobile device 400 and support for one or more applications 406 programs or the application could be a mobile based application or a SIM based application, that implements one or more of the innovative features described herein. In addition, the application programs can include common mobile computing applications (e.g., telephony applications, E-mail applications, calendars, contact managers, web browsers, messaging applications) or any other computing application. The processor 402 in combination with machine learning module (not shown in the FIG. 4) can be configured to execute the analysis engines (explained with reference to FIG. 2) for determining an event or generating a trigger corresponding to the event. For instance, the processor 402 can be configured to detect harsh cornering event based on video frames obtained from a dash camera module, such as, the camera module 102 that is connected to the mobile device 400.

The illustrated mobile device 400 includes one or more memory components, for example, a non-removable memory 408 and/or a removable memory 410. The non-removable memory 408 can include RAM, ROM, flash memory, a hard disk, or other well-known memory storage technologies. The removable memory 410 can include flash memory, smart cards, or a Subscriber Identity Module (SIM). The one or more memory components can be used for storing data and/or code for running the operating system 404 and the applications 406. Example of data can include web pages, text, images, sound files, image data, video data, or other data sets to be sent to and/or received from one or more network servers or other devices via one or more wired or wireless networks. The mobile device 400 may further include a user identity module (UIM) 412. The UIM 412 may be a memory device having a processor built in. The UIM 412 may include, for example, a subscriber identity module (SIM), a universal integrated circuit card (UICC), a universal subscriber identity module (USIM), a removable user identity module (R-UIM), or any other smart card. The UIM 412 typically stores information elements related to a mobile subscriber. The UIM 412 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile device 400 can support one or more input devices 420 and one or more output devices 430. Examples of the input devices 420 may include, but are not limited to, a touchscreen 422 (e.g., capable of capturing finger tap inputs, finger gesture inputs, multi-finger tap inputs, multi-finger gesture inputs, or keystroke inputs from a virtual keyboard or keypad), a microphone 424 (e.g., capable of capturing voice input), a camera module 426 (e.g., capable of capturing still picture images and/or video images) and a physical keyboard 428. The images captured by the camera module 426 can be used to generate triggers to the dash camera module 102. Examples of the output devices 430 may include, but are not limited to a speaker 432 and a display 434. Other possible output devices (not shown in the FIG. 4) can include piezoelectric or other haptic output devices. Some devices can serve more than one input/output function. For example, the touchscreen 422 and the display 434 can be combined into a single input/output device.

A wireless modem 440 can be coupled to one or more antennas (not shown in the FIG. 4) and can support two-way communications between the processor 402 and external devices, as is well understood in the art. The wireless modem 440 is shown generically and can include, for example, a cellular modem 442 for communicating at long range with the mobile communication network, a Wi-Fi compatible modem 444 for communicating at short range with an external Bluetooth-equipped device or a local wireless data network or router, and/or a Bluetooth-compatible modem 446. The wireless modem 440 is typically configured for communication with one or more cellular networks, such as a GSM network for data and voice communications within a single cellular network, between cellular networks, or between the communication system and a public switched telephone network (PSTN).

The mobile device 400 can further include one or more input/output ports 450, a power supply 452, one or more sensors 454 for example, an accelerometer, a gyroscope, a compass, or an infrared proximity sensor for detecting the orientation or motion of the mobile device 400, a transceiver 456 (for wirelessly transmitting analog or digital signals) and/or a physical connector 460, which can be a USB port, IEEE 1394 (FireWire) port, and/or RS-232 port. The illustrated components are not required or all-inclusive, as any of the components shown can be deleted and other components can be added.

With the application (see 406) and/or other software or hardware components, the mobile device 400 can implement the technologies described herein. For example, the processor 402 can send configuration and control data to a dash camera module for configuring operating mode of the dash camera module, receive video frames from the dash camera module related to an event, generate a trigger to the dash camera module for receiving video frames related to the trigger, analyze video frames obtained from the dash camera module and detect events based on the analyzed video frames.

Although the mobile device 400 is illustrated in FIG. 4 in form of a smartphone, but more particularly, the techniques and solutions described herein can be implemented with connected devices having other screen capabilities and device form factors, such as a tablet computer, a smart device, and the like. Without in any way limiting the scope, interpretation, or application of the claims appearing below, a technical effect of one or more of the example embodiments disclosed herein is to provide connected camera architecture, where a computation device, such as, the mobile device 400 connects to a dash camera module for processing video frames of the dash camera module. The connected camera architecture provides a dash camera module that is interoperable with a variety of computation device working on different communication protocols.

Figure 5:
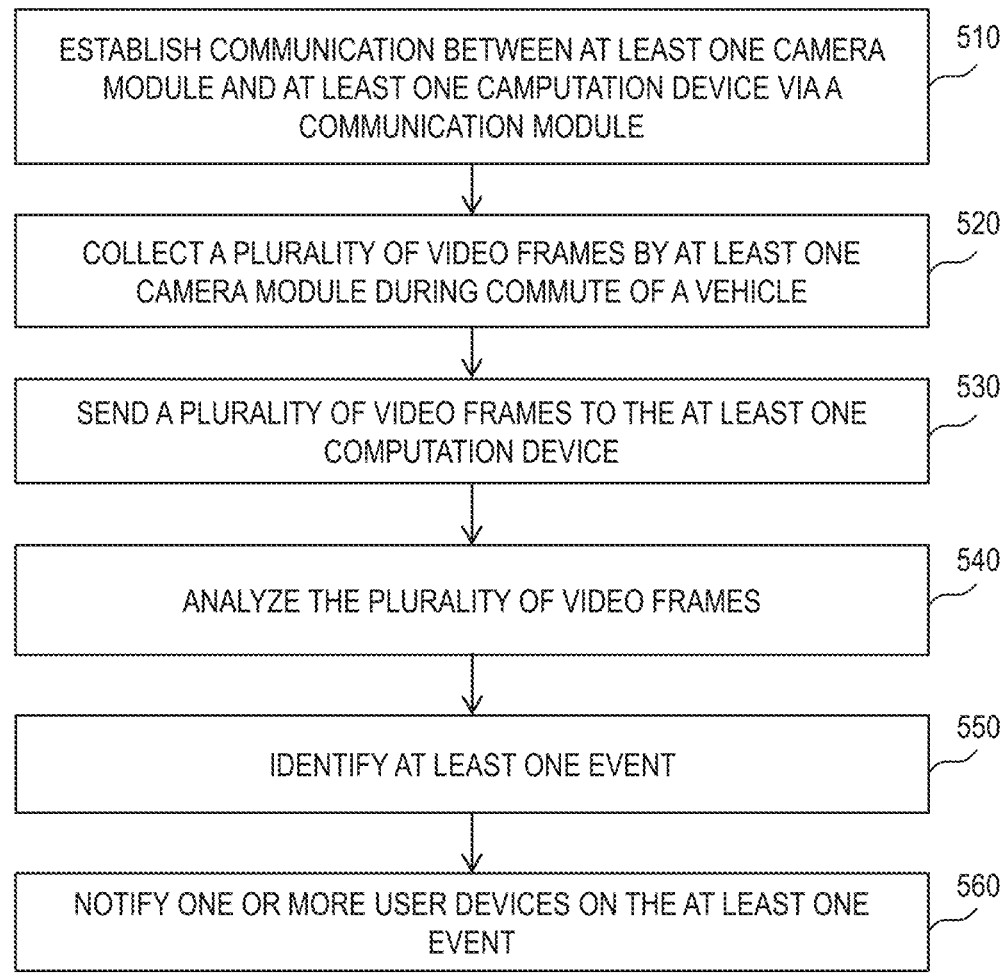
FIG. 5 shows a flowchart illustrating a method of vehicle monitoring, in accordance with an example embodiment.

FIG. 5 shows a flowchart illustrating in detail a method 500 of monitoring of the vehicle, in accordance with an example embodiment. The method 500 includes the step of establishing communication between at least one camera module and at least one computation device via a communication module (step 510). In one embodiment, the communication auto-establishes when the vehicle engine is turned on and powers the at least one camera module camera module, thus turning on the at least one camera module. In preferred embodiment, established communication is carried via point-to-point wireless connection between the at least one camera module and the at least one computation device. The camera modules and the computation devices are configured to communicate in at least one communication mode of a plurality of communication modes comprising the AP mode and the STA mode.

Once the communication is established, the method 500 further includes collecting a plurality of video frames by the at least one camera module during commute of a vehicle (step 520). The video frames may be collected in response to at least one trigger received from the camera module. In one example, video frames are always collected upto a buffer size of limited capacity in first in first out mode. Further, the method 500 includes sending the plurality of video frames to the at least one computation device (step 530).

Furthermore, with respect to FIG. 5, the method 500 includes the step of analyzing the plurality of video frames (step 540); identifying at least one event 550 and notifying one or more user devices on the at least one event (step 560). In one embodiment, the user device may be any portable computation device that is configured to receive event notification from computation device. In a preferred embodiment, the user device may receive the notification via an application designated for the purpose and/or SMS. In another embodiment, the computation device and the user device may be the same.

Figure 6:
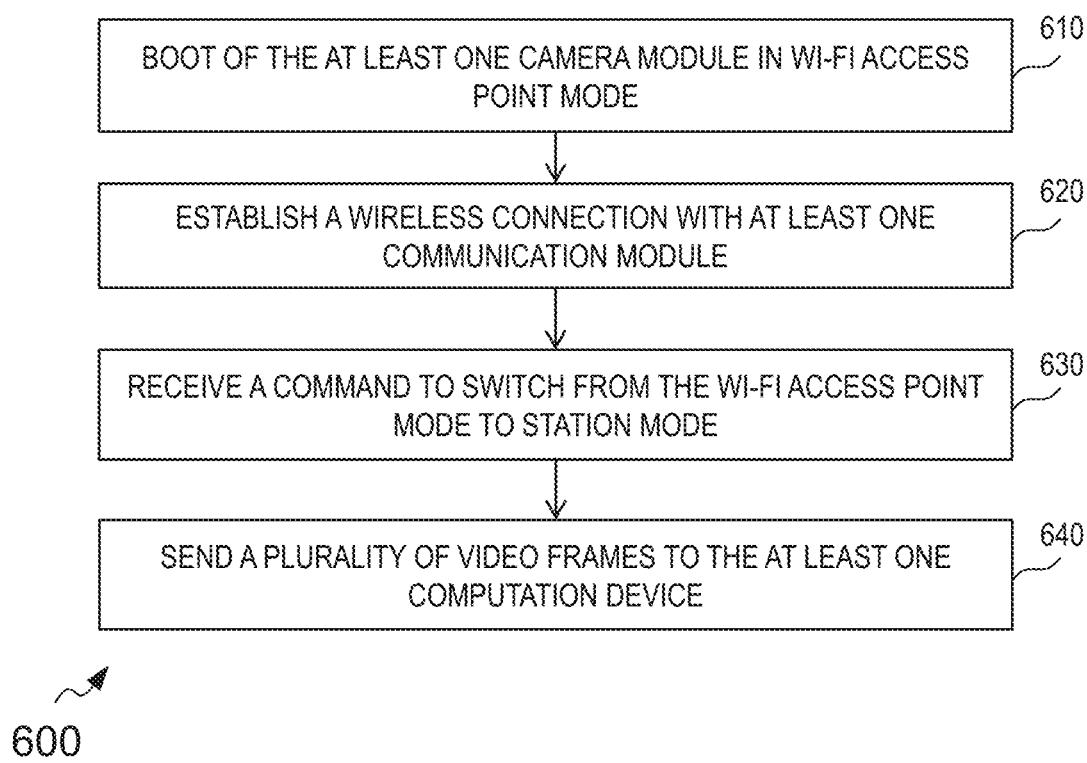
FIG. 6 depicts an exemplary embodiment that shows a flowchart illustrating in detail of a method of communication between at least one camera module and at least one computation device, in accordance with an example embodiment.

FIG. 6 depicts an exemplary embodiment that shows a flowchart illustrating in detail a method 600 of communication between at least one camera module and at least one computation device. To begin with, each of the camera modules is assigned with a SSID and password. As soon as the at least one camera module is turned on, it boots in Wi-Fi access point mode (step 610). As each camera module is assigned with a SSID and password, the at least one computation device is pre-programmed to connect with the at least one camera module (step 620). In access point mode, the at least one camera module is configured to collect at least one video frame and/or sensor data. Further, the at least one camera module receives a command to switch to station mode from the at least one computation device (step 630), and upon receipt of the command, the at least one camera module sends a plurality of video frames and/or sensor data to the at least one computation device (step 640), wherein the camera module is in the STA mode.

Various embodiments disclosed herein provide numerous advantages. The systems disclosed herein provide connected camera architecture for streaming video frames to one or more computation device. The one or more computation devices analyze video frames to detect events and store events related video frames. The proposed hardware architecture for the dash camera module is cost effective yet feature rich enabling support for ADAS features. The computational complexity associated with an event is reduced when the computations are performed in the one or more computation devices. Further, the capability of the dash camera module to operate with multiple computation devices enables distributed computing to detect events. Further, triggers generated by the computation devices and other alternate means enable processing just few frames associated with the event. Furthermore, the dash camera module is configured to operate with a wide variety of computation devices working on different communication protocols. The dash camera module provides users flexibility in installing dash camera modules in the vehicle. Moreover, assigning unique identifier (SSID) and password for each access of the camera module for receiving video frames ensures difficulty in accessing video frames of the camera module by unauthorized personnel. Some embodiments of the invention enable multiple modes of operation of the dash camera module for ensuring interoperability with a variety of computation devices.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, as described and depicted in FIGS. 2 and 4. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A vehicle monitoring system for a vehicle, comprising:
   at least one camera module configured to capture a plurality of video frames of at least one view during commute of the vehicle, the at least one camera module configured to be in a plurality of communication modes comprising an Access point (AP) mode, a Station (STA) mode and a Wi-Fi direct mode; and
   at least one computation device configured to communicate with the at least one camera module in the plurality of communication modes, each of at least one computation device comprising a processor configured to:
      send a notification to the at least one camera module to switch modes within the plurality of communication modes;
      send at least one trigger to the at least one camera module in response to at least one sensor data;
      receive the plurality of video frames from the at least one camera module in the plurality of communication modes in response to the at least one trigger for determining the at least one event;
      determine at least one event from analyzing the plurality of video frames,
      wherein each of the at least one camera module is assigned with a respective service set identifier (SSID) and a respective password by a remote server, and
      wherein the at least one computation device is configured to connect to a camera module of the at least one camera module by providing an SSID and a password received from the remote server for accessing the camera module.

2. The system as claimed in claim 1, wherein the plurality of video frames comprises at least one video frame captured prior to receipt of the at least one trigger and the at least one video frame captured after the receipt of the at least one trigger.

3. The system as claimed in claim 1, further comprising a communication module communicatively connected to the at least one camera module wherein the communication module is a Wi-Fi module configured to create point-to-point wireless connection between the at least one camera module and the at least one computation device.

4. The system as claimed in claim 1, wherein the at least one camera module is further configured to boot in the AP mode as per a pre-setting, and wherein each of the at least one camera module is configured to broadcast respective SSID in the AP mode to which the at least one computation device connects.

5. The system as claimed in claim 4, wherein the at least one camera module is configured with a reset function, wherein the reset function is configured to be activated by the at least one computation device to bring the at least one camera module to the AP mode.

6. The system as claimed in claim 4, wherein the at least one camera module attempts to connect with the at least one computation device for at least one of:
   a predetermined time interval; and
   a predetermined number of attempts, wherein if the camera module of the at least one camera module is not able to connect with the at least one computation device in the predetermined number of attempts, the camera module switches to the AP mode.

7. The system as claimed in claim 1, wherein the camera module of the at least one camera module is configured to operate in the AP mode for a first computation device of the at least one computation device and in the STA mode for a second computation device of the at least one computation device.

8. The system as claimed in claim 7, wherein the camera module is configured to send the plurality of video frames at a first frame rate to the first computation device and at a second frame rate to the second computation device.

9. The system as claimed in claim 1, wherein the at least one sensor data is collected from a sensor unit, which is configured with at least one of: location sensor, contextual sensor, inertial sensor or combination thereof.

10. The system as claimed in claim 1, wherein the at least one trigger comprises change in at least one of: location, position, direction, orientation, velocity, fuel level, weather, lighting, driver pressing a button and combination thereof sensed by a sensor unit.

11. The system as claimed in claim 1, wherein the at least one trigger is generated via voice command.

12. The system as claimed in claim 1, wherein the at least one computing device is configured to wirelessly set one or more parameters of the at least one camera module, one or more parameters comprising:
   capture parameters comprising frame per second (fps), resolution, bit rate and I-frame rate;
   camera position information; and
   camera sensor orientation.

13. The system as claimed in claim 1, wherein the at least one camera module is configured to provide the plurality of video frames in an encrypted format, and wherein an intended computing device from among the at least one computation device is configured to decode the encrypted format.

14. The system as claimed in claim 1, wherein the at least one event includes at least one of: a harsh braking, a harsh acceleration, a cornering event, a lane change event, a pedestrian crossing event, stop sign violation, traffic sign violation, tail gating, vehicles passing in blind spot, objects to the rear of the vehicle while backing up and a traffic signal violation.

15. The system as claimed in claim 1, wherein the at least one camera module is a dash camera installed on at least one of a rear windshield and a front windshield of the vehicle.

16. The system as claimed in claim 1, wherein the at least one computation device includes a portable device with the processing and cellular communication capabilities including at least one of: a smart phone, tablet and mobile computer.

17. The system as claimed in claim 1, wherein the at least one computation device is configured in an on-board diagnostic port assembly.

18. The system as claimed in claim 1, wherein the at least one computation device is configured to provide at least one notification of the at least one event to one or more user devices.

19. The system as claimed in claim 1, further comprising a wearable device configured to generate at least one trigger and send the at least one trigger to the at least one computation device, wherein the at least one computation device further sends the at least one trigger to the at least one camera module.

20. A vehicle monitoring method for a vehicle, comprising:
   establishing communication between at least one camera module and at least one computation device via a communication module wherein the at least one camera module and the at least one computation device are configured to be in at least one communication mode of a plurality of communication modes comprising an Access point (AP) mode and a Station (STA) mode;

collecting a plurality of video frames of at least one view during commute of the vehicle in response to at least one trigger received by the at least one camera module;

sending a notification to the at least one camera module to switch modes within the plurality of communication modes, the notification comprising a service set identifier (SSID) and a password for respective camera module of the at least one camera module, wherein switching mode comprises switching from the AP mode to the STA mode, wherein an SSID and a password of the at least one camera module are obtained by the at least one computation device from the remote server for accessing the at least one camera module;

sending at least one trigger to the at least one camera module in response to at least one sensor data;

receiving the plurality of video frames in an encrypted format at the at least one computation device when the at least one camera module is in the STA mode in response to the at least one trigger for determining the at least one event, wherein an intended computation device from among the at least one computation device is configured to decode the encrypted format; and identifying at least one event by analyzing the plurality of video frames.

21. The method as claimed in claim 20, wherein each of the at least one camera module is assigned with a respective SSID and a respective password, and the wireless communication is established between a camera module of the at least one camera module and a communication module of the at least one communication module based on matching an SSID and a password received from the communication module with the SSID and the password assigned to the camera module.

22. The method as claimed in claim 20, further comprising enabling the camera module of the at least one camera module to operate in the AP mode for a first computation device of the at least one computation device and to operate the camera module in the STA mode for a second computation device of the at least one computation device.

23. The method as claimed in claim 20, wherein the camera module is configured to provide the plurality of video frames at a first frame rate to the first computation device and at a second frame rate to the second computation device.

24. A method of communication between at least one camera module and at least one computation device arranged in a vehicle, the method comprising:

booting of the at least one camera module in a Wi-Fi access point (AP) mode, wherein each of the at least one camera module is assigned with a respective service set identifier (SSID) and a respective password by a remote server;

establishing a wireless connection with the at least one computation device by allowing the at least one computation device to connect with the at least one camera module in a station (STA) mode, wherein establishing the wireless connection comprises providing a SSID and a password obtained by the at least one computation device from the remote server for accessing the at least one camera module;

receiving, by the at least one camera module, a command to switch from the Wi-Fi AP mode to the STA mode;

receiving, by the at least one camera module, at least one trigger from the at least one computation device; and sending, by the at least one camera module, a plurality of video frames in an encrypted format of at least one view during commute of the vehicle in response to the at least one trigger to the at least one computation device in the STA mode, wherein an intended computation device from among the at least one computation device is configured to decode the encrypted format.

* * * * *